April 11, 1972 R. L. JAESCHKE Re. 27,337

EDDY CURRENT COUPLING

Original Filed Sept. 13, 1966

INVENTOR.
RALPH L. JAESCHKE

BY Teagno & Toddy
ATTORNEYS

United States Patent Office

Re. 27,337
Reissued Apr. 11, 1972

27,337
EDDY CURRENT COUPLING

Ralph L. Jaeschke, Kenosha, Wis., assignor to Eaton Corporation, Cleveland, Ohio Original No. 3,486,052, dated Dec. 23, 1969, Ser.No. 579,117, Sept. 13, 1966. Application for reissue Aug. 17, 1970, Ser. No. 64,417
Int. Cl. H02k *49/02*
U.S. Cl. 310—105 5 Claims

Matter enclosed in heavy brackets [ ] appears in the original patent but forms no part of this reissue specification; matter printed in italics indicates the additions made by reissue.

ABSTRACT OF THE DISCLOSURE

A single support, stationary field eddy current coupling having two rotors. One of the rotors includes three annular series of poles. Two series of poles are displaced axially from each other and magnetically isolated from the third series of poles. The third series of poles which is interposted between the said two series is also magnetically isolated from the hub member of the one said rotor. The other rotor includes two cylindrical magnetic inductor members magnetically isolated from each other which surround but are separated from said poles by an air gap whereby the magnetic flux generated by the field member crosses said air gap four times.

This invention relates to electromagnetic couplings and more particularly to an improved form of such a coupling which can be used to advantage in motor drive coupling units and in various other power transmission applicatons.

An object of the invention is to provide a new and improved arrangement of magnetic poles and inductor drum for electromagnetic couplings such that, for a unit having a single field coil, a maximum number of traverses of flux across the magnetic gap is achieved.

A further object of the invention is to provide a magnetic pole and inductor drum configuration of electromagnetic couplings wherein approximately twice as much torque is provided than was previously available in structures of comparable size and weight.

A further object of the invention is to provide an electromagnetic coupling having an annular series of pole members which are magnetically isolated from the hub member of one of the rotors of the coupling and having at least two other annular series of pole members which are axially displaced from each other wherein both are magnetically isolated from said first series of pole members.

Another object of the invention is to provide a comparatively small and light electromagnetic coupling for a given capacity and having a stationary field member surrounding a field coil means with an outer annular pole portion in surrounding relation to an adjacent portion of an associated rotatable magnetic pole structure resulting in an axial shortening of the structure.

The invention accordingly comprises the elements and combination of elements, features of construction and arrangements of parts which will be exemplified in the structures hereinafter described and the scope of which will be indicated in the following claims.

Figure 1:
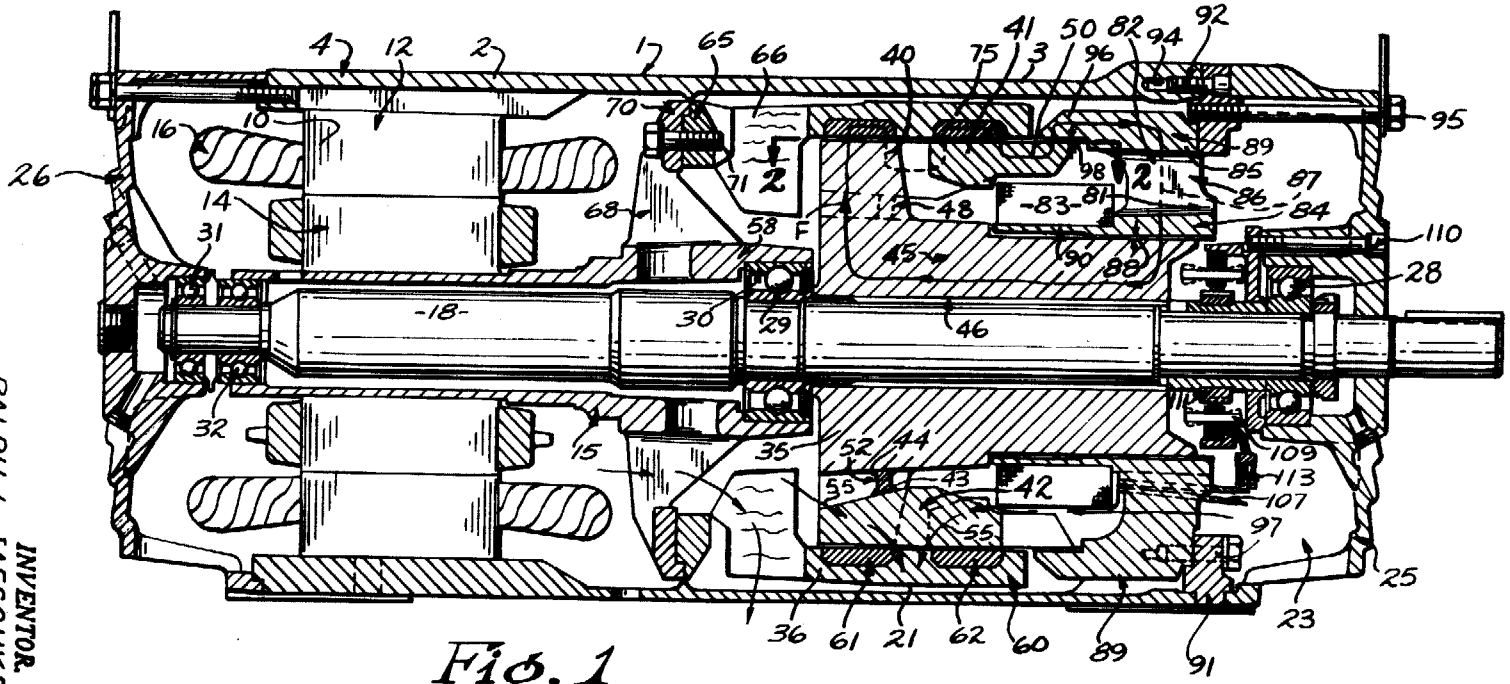
FIGURE 1 is an axial section of the unit.

In the following description, an electromagnetic slip coupling is intended to cover eddy-current brakes and dynamometers which are, in effect, slip couplings in which one of the members is held stationary, as well as eddy-current clutches.

The accompanying drawings disclose the electromagnetic opening apparatus 1 of the present invention including a motor-driven, variable-speed output power mechanism having a motor section 2 and an axially adjacent coupling section 3 contained in a single housing 4. The motor section 2 contains an electric motor 10 which is of the conventional type comprising a stator 12 connected to the housing 4, and rotor 14 secured to a hollow or quill shaft member 15. Both the stator 12 and rotor 14 consist of a laminated construction, and the stator 12 is provided with field windings 16.

The coupling section 3 is provided with a plurality of air outlet openings 21 on opposite sides of the housing 4 adjacent the external wall together with a plurality of air inlet openings 23 which are provided for in the cover member 25 at the right end of the housing 4.

The housing 4 is provided with several suitable bearing members which are provided for rotating the coupling apparatus 1 and rotor 14 of the motor 10. These bearing members include anti-friction bearing 28 located in cover member 25, an intermediate bearing 29 mounted in bore 30 and bearing members 31 and 32 provided for on the left-hand side of the housing 4 which support the quill member 15 and coaxial shaft 18 for rotation therein. The quill shaft assembly 15 and 18 is merely exemplary, and other co-axial shaft assemblies may be used.

The coupling apparatus 1 comprises relatively rotatable rotor members which the particularly represented by an inner rotor 35 mounted for rotation on the shaft member 18, and outer rotor member 36 mounted for rotation on the quill shaft 15.

When the shaft 15 is driven by motor 10, shaft 15 is considered the power input shaft and shaft 18 is considered the power output shaft which is adapted to be connected to a driven load (not shown). It is equally feasible to apply power to the shaft 18 in which event shaft 15 would be the power output shaft.

Inner rotor 35 comprises a plurality of spaced pole members, and, in particular, three series or groups of pole members 40, 41 and 42 which are disposed circumferentially around and carried by the inner hub member 45 secured to shaft 18 by means of a key member 46.

Figure 2:
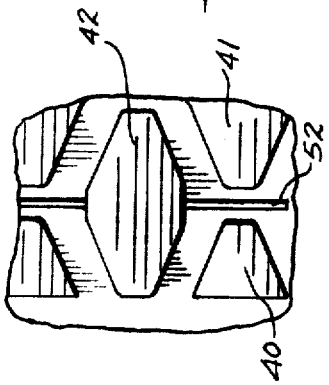
FIGURE 2 is a developed plane view showing certain pole faces as viewed along line 2—2 of FIGURE 1. Similar reference characters indicate corresponding parts throughout the several views of the drawings.

The series of pole members 40 which are toothlike in appearance axially extend from the outer end portions of radial arms 48 which project from hub member 45. The series of pole members 41 are formed by axially projecting toothlike portions of an annular pole ring means 50. The series of pole members 42 are welded at 43 to a nonmagnetic support ring 52 which may consist of stainless steel, aluminum and other non-magnetic metals and acts to magnetically isolate pole member 42 from pole members 40 and 41 and hub 45. Ring 52 is welded to hub 45 by welds 44. Support ring 52 may also consist of magnetic material in which case welds 44 act to magnetically isolate ring 52 from hub 45 thus preventing the flux which passes through pole members 42 from short circuiting through hub 45. Each pole member 42, as shown in FIGURE 2, is disposed between adjacent pole members 40 and 41.

Rotor member 35 is also provided with axial air passages represented by arrows 55 which extend into the rotor 35 as shown in FIGURE 1.

The outer rotor 36 comprises an annular inductor means shown as eddy-current drum member 60 and comprising at least two cylindrical inductor members 61 and 62 respectively which consist of magnetic material such as iron. The exposed surfaces of inductor members 61 and 62 are uniformly radially spaced from and oppositely face the annular series of pole members 40, 41 and 42 in a co-operative relation to be described hereinafter. Drum member 60 is connected to a support ring 65 by a plurality of circumferentially spaced air-impelling blades 66. Support ring 65 is secured by suitable means 71 to a mounting ring 70 which extends around and is connected to the hub portion 58 of the shaft 15 by spider arms 68.

The fin members 66 affixed to the outer rotor member 36 provide for cooling the drum and pole members of an eddy-current coupling. During operation air is pulled in through inlets 23 of end member 25, drawn through the inner and outer rotor members 35 and 36 as evidenced by passage 55 leaving the housing through output apertures 21. Air is also pulled in from the motor section 2. through passage 55 and out the aperture 21.

The cylindrical inductor members or sleeves 61 and 62 are magnetically isolated from each other by using non-magnetic material 75, such as aluminum or copper or alloys of aluminum or copper in the drum member 60. This particular drum structure comprising the two cylindrical magnetic inductor members 61 and 62 and the non-magnetic material 75 is an important part of this invention as will appear later when the operation of the coupling is discussed.

Field means 81 comprises a stationary ring-shaped field member 82 having inner and outer annular portions 84 and 85 respectively connected by an intermediate body portion or spider member 86 containing an annular series of axially extending air passages 87. The inner annular portion 84 is disposed in an adjacent surrounding relation to the hub member 45 with an intervening annular air gap 88 existing therebetween. The inner annular portion 84 includes an axially projecting annular flange forming a ledge 90 for supporting the coil means 83. The coil means 83 is here shown as being a ring-shaped coil received a the ledge 90 and suitably retained thereon.

The outer portion 85 of field member 82 includes an annular end portion 89 at the outer axial end thereof attached to an annular support ring 91 by screws 97. The field member 81 is mounted on the housing 4 by means of attaching screws 92 extending through the support ring 91 and having threaded engagement in tapped holes 94 of the housing. The end cover 25 is here shown as being secured against the support ring 91 by suitable connecting screws 95.

The outer annular portion 85 of the field member 81 further includes a pole ring portion 96 located in an opposed co-operative relation to the pole ring member 50 of the inner rotor 35. The pole ring portion 96 is preferably disposed in an external surrounding and axially overlapped relation to the pole ring means 50 of such inner rotor and is spaced therefrom by a uniform annular air gap 98. The pole ring portion 96 is also located radially outward and in a surrounding relation to the coil means 83. The external overlap relation of the pole ring portion 96 of the field member 81 is important since it achieves a desirable compast assembly relationship between the field means 81 and inner rotor 35.

Also included in the housing 4 axially disposed between the end member 25 and the inner rotor 35 is a stator 109 of an AC salient pole permanent magnet generator, the poles 111 of which are attached to the shaft 18. Fastening bolts therefor are shown at 110 and part of the output circuit of the generator is indicated by the wire 113. Wires 107 from the field coil member 83 and 113 from the motor 109 may be led out through the lower air inlet openings 23 of the end member 25. This governor generator 109 acts as a speed tachometer, the output of which feeds back to a control system which supplys DC current to the field winding 83 in order to maintain a constant speed of the output member under variable load conditions.

The magnetic circuit portions of members 35, 45, 81, 40, 41, 42, 50, 48, 61 and 62 are comprised of a suitable ferromagnetic material to produce a magnetic flux when the field coil is excited.

In operation of the coupling apparatus 1, the motor 10 is energized thus rotating the shaft 15 which, in turn, rotates the input drum 60 of rotor member 36 at a desired constant speed. Upon energizing field coil 93 with direct current, a toroidal flux field is brought into existence surrounding coil 83. In FIGURE 1 the arrows F diagrammatically indicate a mean path of such a field. As shown in the drawing, the flux emanates in concentration from the pole member 40, crosses the air gap, and enters the inductor drum 60 at sleeve member 61. It then leaves the sleeve member 61, crosses the air gap, and enters the pole member 42, the flux bridges the air gap, entering again the drum 60 at sleeve 62. The flux then leaves the sleeve member 62, crosses the air gap, and enters the pole member 41. It then leaves the pole member 41, crosses air gap 98 and enters the field pole ring 96 passing through field member 82 as shown and leaving the field member 82 at portion 84, bridging air gap 88 and entering the hub member 45 of the inner rotor 35. The result of such a flux path as shown by arrows F, crosses the magnetic gap between the inner and outer rotors four times. In prior art structures of similar size and weight, the flux only crossed the gap between the inner and outer rotor twice. As a result, the torque produced by the structure of the present invention and caused by the reactive field of the eddy currents in inductor members 61 and 62 of drum 60 with the polar fields in poles 40, 41 and 42 is approximately twice as much as if the magnetic circuit were allowed to proceed from poles 40, drum member 61 or 62 and pole 41 as in the case of prior art structure. Thus, it is readily seen that as a result of the magnetic isolation of pole members 42 from pole members 40 and 41 and the inner rotor member 35 and hub 45 created by support ring 52, as well as magnetic isolation of inductor cylindrical members or sleeves 61 and 62 on the outer rotor 36 created by non-magnetic material 75, a vastly improved magnetic circuit is provided. The combination, therefore, of the inner and outer rotors 35 and 36, together with the particular field structure 81, provides a compact lightweight electromagnetic coupling which is capable of transmitting approximately twice as much torque as a coupling of comparable size and weight.

What is claimed is:

[1. An electromagnetic coupling comprising a housing, a stationary field coil adapted to produce a toroidal flux field, an annular magnetic ring supporting said field coil, a bearing arrangement supported by said housing, a plurality of shaft members rotatable within said bearing structure, a first rotor means connected to one of said shaft members, a second rotor means connected to said other of said shaft members, said first rotor means including an annular hub of magnetic material lying between said coil and said one shaft member, a plurality of first and second axially displaced pole members connected to said first rotor means, a plurality of third pole members connected to said first rotor means and disposed between said first and second pole members, means for effectively magnetically isolating said third pole members from said first and second pole members and from said hub, said second rotor means comprising an inductor means having at least a pair of magnetically isolated cylindrical magnetic sleeve portions facing said pole members across an air gap.]

[2. Apparatus according to claim 1 wherein aluminum is interdisposed between said cylindrical magnetic sleeve portions for magnetically isolating said portions from each other.]

[3. An electromagnetic coupling comprising a housing, a stationary field coil adapted to produce a toroidal flux field, an annular magnetic ring supporting said field coil, a bearing arrangement supported by said housing, shaft members rotatable within said bearing structure, a first rotor means including an annular hub connected to one of said shaft members, a second rotor means connected to the other of said shaft members, said first rotor means including a plurality of first and second magnetic pole members, said first and second pole members being disposed between said coil and said second rotor means, a plurality of third magnetic pole members connected to said first rotor means and disposed between said first and second pole members, means for effectively magnetically isolating said third magnetic pole member from said first and second pole members and from said hub, said second rotor means including an inductor drum member having a plurality of cylindrical magnetic sleeve portions spaced from the facing said pole members, and nonmagnetic material disposed between said magnetically isolating said magnetic cylindrical sleeve portions from each other.]

4. The apparatus according to claim [3] 7 wherein said non-magnetic material is aluminum.

[5. The apparatus according to claim 3 wherein said magnetic ring supporting said field coil includes a spider means on one side of said coil and annular magnetic means axially extending from said spider means and circumferentially surrounding at least a portion of said field coil.]

6. An electromagnetic coupling comprising a housing, a stationary field coil adapted to produce a toroidal flux field, an annular magnetic ring supporting said field coil, a bearing arrangement supported by said housing, a plurality of shaft members rotatable within said bearing structure, a first rotor means connected with one of said shaft members, a second rotor means connected with said other of said shaft members, said first rotor means including an annular hub of magnetic material lying between said coil and said shaft member, a plurality of first and second magnetic pole members attached to said first rotor means and disposed between said coil and said second rotor means, a plurality of third magnetic pole members attached to said first rotor means and disposed *interdigitatedly* between said first and second pole members, means for effectively magnetically isolating said third pole members from said first and second pole members and from said hub first rotor means, said second rotor means including an inductor drum member having a plurality of cylindrical magnetic sleeve portions spaced from and facing said pole members, non-magnetic material disposed between and magnetically isolating said magnetic cylindrical sleeve portions from each other, said annular magnetic ring supporting said field coil including a spider means disposed on one side of said coil, annular magnetic means axially extending from said spider means and circumferentially surrounding at least a portion of said held coil and facing one of said pole members across an air gap.

*7. An electromagnetic coupling comprising a housing; a stationary field coil adapted to produce a toroidal flux field, an annular magnetic ring supporting said field coil, said magnetic ring including a spider means on one side of said coil and annular magnetic means axially extending from said spider means and circumferentially surrounding at least a portion of said field coil, a bearing arrangement supported by said housing, shaft members rotatable within said bearing structure, a first rotor means including an annular hub connected to one of said shaft members, a second rotor means connected to the other of said shaft members, said first rotor means including a plurality of first and second magnetic pole members, said first and second pole members being disposed between said coil and said second rotor means, a plurality of third magnetic pole members connected to said first rotor means and disposed interdigitatedly between said first and second pole members, means for effectively magnetically isolating said third magnetic pole member from said first and second pole members and from said hub, said second rotor means including an inductor drum member having a plurality of cylindrical magnetic sleeve portions spaced from the facing said pole members, and nonmagnetic material disposed between and magnetically isolating said magnetic cylindrical sleeve portions from each other.*

*8. Apparatus according to claim 7 wherein said means for effectively magnetically isolating said third pole members from said first and second pole members and from said hub comprises a single annular ring of magnetically non-conductive material.*

*9. Apparatus of claim 8 in which said annular ring of non-magnetic material is aluminum.*

References Cited

The following references, cited by the Examiner, are of record in the patented file of this patent or the original patent.

UNITED STATES PATENTS

| | | | |
|---|---|---|---|
| 2,648,020 | 8/1953 | Jaeschke | 310—105 |
| 3,089,046 | 5/1963 | Jaeschke | 310—105 |
| 3,089,971 | 5/1963 | Wheeler | 310—105 |
| 3,167,674 | 1/1965 | Woodward | 310—105 |
| 3,198,975 | 8/1965 | Fisher | 310—105 |
| 3,209,184 | 9/1965 | Woodward | 310—103 |
| 3,217,197 | 11/1965 | Stutzenegger | 310—105 |
| 3,389,280 | 6/1968 | Herrick | 310—105 |

DAVID X. SLINEY, Primary Examiner

U.S. Cl. X.R.

310—98